July 1, 1969   J. F. KISHEL   3,452,599
TEMPERATURE MEASURING DEVICES
Filed Dec. 22, 1966

INVENTOR.
Joseph F. Kishel
BY
ATTORNEY

FIG. 4A
FIG. 4
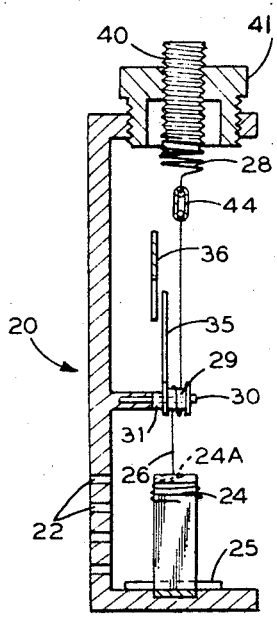
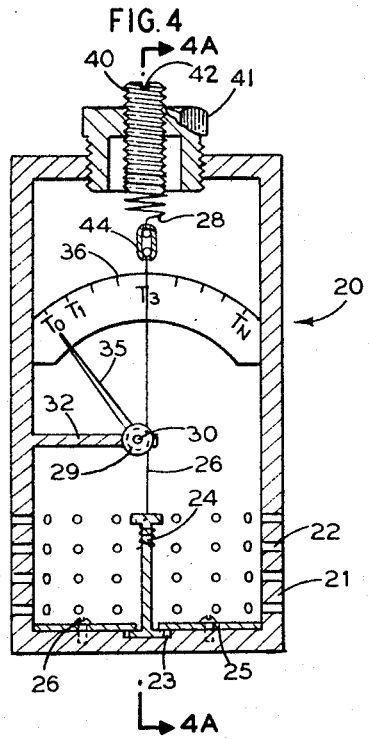
FIG. 5
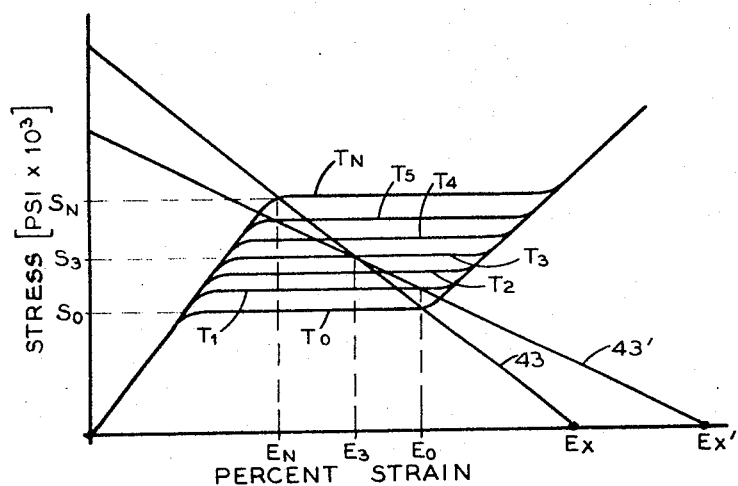

United States Patent Office 3,452,599
Patented July 1, 1969

3,452,599
TEMPERATURE MEASURING DEVICES
Joseph F. Kishel, Berkeley Heights, N.J., assignor to Weston Instruments, Inc., Newark, N.J., a corporation of Delaware
Filed Dec. 22, 1966, Ser. No. 603,875
Int. Cl. G01k 5/48
U.S. Cl. 73—363                                                   11 Claims

ABSTRACT OF THE DISCLOSURE

A device for measuring a change in ambient temperature which embodies a transducer for converting ambient thermal energy to mechanical energy. The transducer is composed at least in part of a super-elastic metal alloy. An element composed of the super-elastic metal is mechanically connected to an indicating means for providing an indication of a change in temperature in response to a mechanical force applied thereto. A wire is connected to the thermal element, the indicator and a spring in succession and as temperature increases the metal expands and the spring withdraws toward its original shape and thereby moves the wire and the indicator to indicate said temperature change.

---

This invention relates generally to devices for measuring or detecting changes in temperature and, more particularly, to a thermometer which utilizes a super-elastic element for converting ambient thermal energy into mechanical energy.

Devices of the type presently under consideration detect changes in temperature by converting a change in thermal energy to a corresponding change in mechanical energy. To perform this conversion such devices utilize transducers of various types. One of the more useful types of transducers which is used extensively in the temperature measuring art is the bimetallic coil. A typical bimetallic coil is formed of two helical metal strips having dissimilar coefficients of linear expansion, the strips being bonded together so as to produce an angular displacement at one end of the coil which corresponds to a change in ambient temperature sensed by the coil.

Transducers of this type and other conventional transducers which convert a change in ambient temperature to an angular or linear displacement of one end of the transducer provide relatively small magnitude forces with such displacements. This disadvantage of conventional transducers may be unimportant when no size limitation is placed upon the temperature measuring gauge which embodies that transducer but becomes quite important when the temperature gauge must be of relatively small size, so as to be portable, for example.

Another common disadvantage of conventional temperature measuring instruments or gauges is that it is generally difficult to change the scale factor and temperature measuring range of the instrument. In situations where the temperature measuring gauge may be measuring temperatures having a wide range of values, it is essential that the scale factor and temperature range of the gauge be adjusted accordingly. It would, of course, be advantageous if this adjustment could be made easily by using commonly available tools, such as screwdrivers and wrenches.

Certain metal alloys in crystalline form have been found to exhibit what may be regarded as "super-elastic" characteristics. Alloys known to possess super-elastic properties are, for example, disclosed in an article entitled "A 'Super-Elastic' Single Crystal Calibration Bar" by W. A. Rachinger in the British Journal of Applied Physics, vol. 9, June 1958 and include alloys of gold-cadmium, indium-thallium, copper-gold-zinc and copper-aluminum-nickel. While these four alloy systems exhibit super-elastic properties, other presently unknown alloy systems may also possess this property to a greater or lesser extent.

The copper-aluminum-nickel alloy system has the recognized advantages over the other three alloy systems of being both less expensive and corrosion-resistant. For reasons which will become evident subsequently, alloy systems having stoichiometric proportions of copper-aluminum-nickel one especially useful in fulfilling the requirements of the present invention. The percent by weight of the various alloy constituents forming, for example, the copper-aluminum-nickel system is disclosed by the aforementioned Rachinger article as 82.5% copper, 14.5% aluminum and 3% nickel. To obtain an independent evaluation of the copper-aluminum-nickel system, single and polycrystalline structures having these percentages of copper, aluminum and nickel, were subjected to conventional tensile tests on conventional tensile testing apparatus. The data obtained from these tests was recorded and recorded values of tensile stress were plotted against recorded values of percent total strain on a two dimensional (X–Y) coordinate system with applied stress as the ordinate and percent strain (or elongation) as the abscissa.

An analysis of the plotted data established that single crystals formed of a super-elastic alloy of copper-aluminum-nickel possessed the following three properties. Firstly, the crystals could be characterized by a family of curves having parallel "plateau regions" of constant values of stress beginning at approximately 2% total strain or elongation and extending through a considerable range of between 5% to 9%, total strain. Hence the term "super-elastic" is conveniently used by those working in metallurgical arts to describe the relatively extensive elongation which occurs in the crystalline element without an accompanying increase in stress. Secondly, no significant mechanical hysteresis appeared in the plateau region when the crystalline specimen was unloaded by the tensile force-applying apparatus as long as a particular value of strain or elongation was not exceeded. Thirdly, an essentially linear relationship was observed between the parameters of plateau stress and ambient crystal temperature for crystal temperatures greater than zero degrees Fahrenheit. Whereas the first two properties of alloys of this type are disclosed by the aforementioned Rachinger article, the third property concerning the relationship between ambient temperature and plateau stress was hitherto unknown in the art.

It is an object of this invention to provide a transducer for use in a temperature measuring instrument or device which may be relatively easily constructed and which provides a high magnitude mechanical force in response to a change in ambient temperature.

Another object of this invention is to provide a thermometer which utilizes a transducer having the characteristics described in the above object and which may have its scale factor and temperature measuring range changed readily and easily.

Yet, another object of this invention is to provide a temperature measuring device which utilizes a unique transducer for converting thermal energy to mechanical energy.

It is another object of this invention to provide a new and improved device for detecting changes in temperature which utilizes the aforedescribed properties of super-elastic crystalline structures.

A further object of this invention is to provide a temperature measuring device which utilizes a transducer comprised of a super-elastic metal alloy for converting ambient temperature into a corresponding mechanical force.

According to this invention, a device for detecting a change in temperature is provided which includes a thermal to mechanical energy transducer which comprises a crystalline structure, having super-elastic properties. The transducer is characterized by a family of tensile stress-strain curves having parallel stress plateau regions where the magnitude of tensile stress is independent of strain for a considerable range of values of strain and the plateau stress itself is proportional to a range of ambient temperatures. Mechanism, in the form of a pretensioned helical spring, is provided for loading the transducer in tension so that the tensile force applied thereto bears a linear relationship to thermally-induced elongation and contraction of the transducer. The tensile loading of the transducer is representable by a negatively-sloped load line on the family of stress-strain curves; the magnitude of the loading being adjustable so that the load line intersects the plateau regions in the desired temperature detection or measuring range of the transducer. Additional mechanism is provided which responds to a temperature-induced change in the tensile stress of the transducer to indicate the corresponding ambient temperature of the device.

For a better understanding of the present invention, together with other and further objects thereof, reference may be had to the following description taken in connection with the accompanying drawings, the scope of the invention being pointed out in the appended claims.

Referring to the drawings:

FIGURE 4 is a sectional front view of a device constructed in accordance with the principles of this invention for detecting changes in ambient temperature.

FIGURE 4A is a sectional side view taken along section lines 4A—4A in FIGURE 4 showing mechanism for converting thermally-induced stress changes in a super-elastic crystal to corresponding angular displacements of a temperature indicating pointer.

FIGURE 5 illustrates typical operating characteristics of the device of FIGURE 4.

Figure 1:
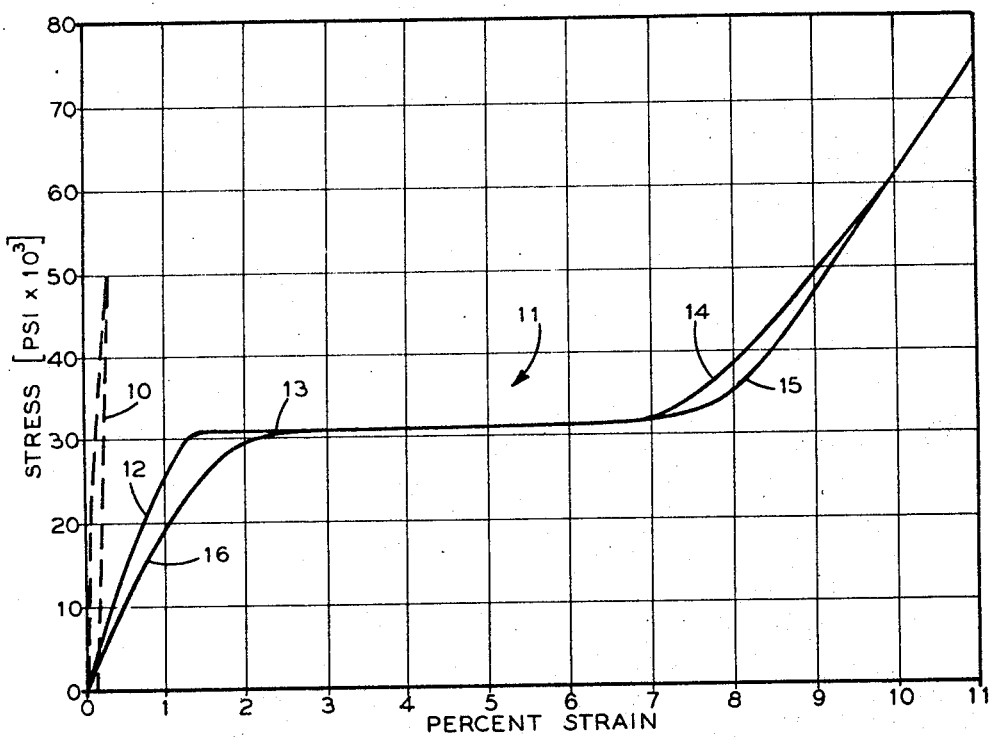
FIGURE 1 illustrates a typical stress versus strain curve of a more conventional metal alloy and for comparison shows a typical stress versus strain curve of a super-elastic metal alloy.

Referring to FIGURE 1 of the drawings for a more complete understanding of the invention, there is shown a stress versus strain curve 10 of a more conventional metal alloy, specifically brass, and for comparison thereto a stress versus strain curve 11 of a super-elastic crystalline structure alloyed with 82.5% copper, 14.5% aluminum and 3% nickel, the percentages being by weight.

The stress-strain curve 10 is plotted from data obtained through the usual technique of applying at a constant temperature (85° F.) a constantly increasing tensile force to a brass rod until the applied tensile stress reaches some value which is less than the elastic limit of the drawn rod, in this case 50×10³ p.s.i. The loading of the rod is then reversed until a condition of zero tensile stress is reached. A permanent set of approximately .25% strain normally occurs in the rod after it is loaded and unloaded once.

In contrast to the stress versus strain curve of a more conventional metal alloy, curve 11 depicts graphically the stress versus strain characteristics of a super-eleastic alloy which has been loaded and unloaded three times in succession at 85° F. The curve 11 includes a region 12 where the relationship between tensile stress and total strain or elongation is positive and practically linear and is, therefore, sometimes referred to as the "first Hooke's law region" of super-elastic metal alloys. It may be recalled that the Hooke's law region for a tensioned metal is that region where the ratio of applied stress to percent strain is constant. As the stress increases to about 2% strain, the linear region 12 levels off to a plateau region designated by the numeral 13. Once the plateau level of stress is reached with essentially no increase in applied tensile force, the metal can be expected to elongate from about 2% to about 7% or 8% of its initial total length and may elongate to as much as 9% of its initial total length. The plateau region 13 may therefore be viewed as one where the modulus of elasticity of the metal is practically zero and where the stress remains constant for a wide range (2% to 7–9%) of strain. While in the plateau region the metal exhibits a super-elastic response to tensile loads.

The characteristics of super-elastic metals, particularly super-elastic crystals, to behave in this manner is attributed by those working in this art to the appearance and growth of a martensite phase in the beta matrix of the alloy. The martensite phase may develop as the crystal is stressed from 0% strain to approximately 2% strain and takes the form of needle-like structures which appear in the beta phase. In the plateau region the martensite grows rapidly in size and the number of needle-like structures increase rapidly with elongation of the crystal. The transformation of the crystalline structure from a beta phase to a martensitic phase is visually detectable because the growth of martensite causes the crystal to change color from red to yellow. The completion of the martensitic transformation generally occurs between 6% to 9% of strain and in this range of strain the crystal exhibits a predominantly yellow color.

Referring again to FIGURE 1, as the crystal is stressed above the stress value required to move into the plateau region, the crystal then offers a significant resistant to the applied tensile force and the relationship between stress and strain again becomes somewhat linear, as indicated by the numeral 14. No visual changes were observed to occur in the region of 9% to 11% strain. This region is generally referred to by those working in this art as the "second Hooke's law region" of super-elastic alloys because of its linearity and positive slope. Twinning of the martensitic phase in the untransformed beta phase has been observed to occur in the second Hooke's law region. Although not of interest to the present invention it bears mentioning that if the super-elastic alloy is stressed beyond the second Hooke's law region the stress will peak and thereafter decrease nonlinearly with increasing elongation. Thereafter, the stress may increase slightly with increasing elongation until fracture occurs around 18% to 24% strain.

If a single crystal alloyed with 82.5% cooper, 14.5% aluminum and 3% nickel is not stressed to its point of fracture and the applied tensile force is reversed while the crystal is well within its second Hooke's law region, the crystal can be expected to undergo a slight mechanical hysteresis upon its return to the plateau region, as indicated by the numeral 15. However, if the ambient temperature remains constant after the crystal returns to its plateau region, it has been found to exhibit no mechanical hysteresis until the stress is further reduced below the plateau stress level of approximately 32×10³ p.s.i., as indicated by numeral 16. The absence of mechanical hysteresis in the plateau region is attributed to a fully reversible martensitic to beta phase transformation which appears to be characteristic of such crystals. The reversible transformation which occurs in this region is visibly detectable by a change in crystal color from yellow to red. Tests have demonstrated that if the single crystal is not stressed beyond its characteristic plateau region, that is, into the second Hooke's law region, the same stress-strain curve is traced under repeated loading of the specimen without detectable hysteresis.

Although not known for certain, it is believed that polycrystalline specimens of super-elastic alloys are likely to exhibit nonlinear plateau stress versus temperature characteristics as well as mechanical hysteresis in the plateau region. For these reasons polycrystalline elements might not be as desirable as single crystal elements for the purpose of this invention. Of course, a particular polycrystalline alloy might exhibit practically linear plateau stress versus temperature characteristics and negligible hysteresis in the plateau region and, therefore, find equal utility with single crystals in the device of this invention.

Figure 2:
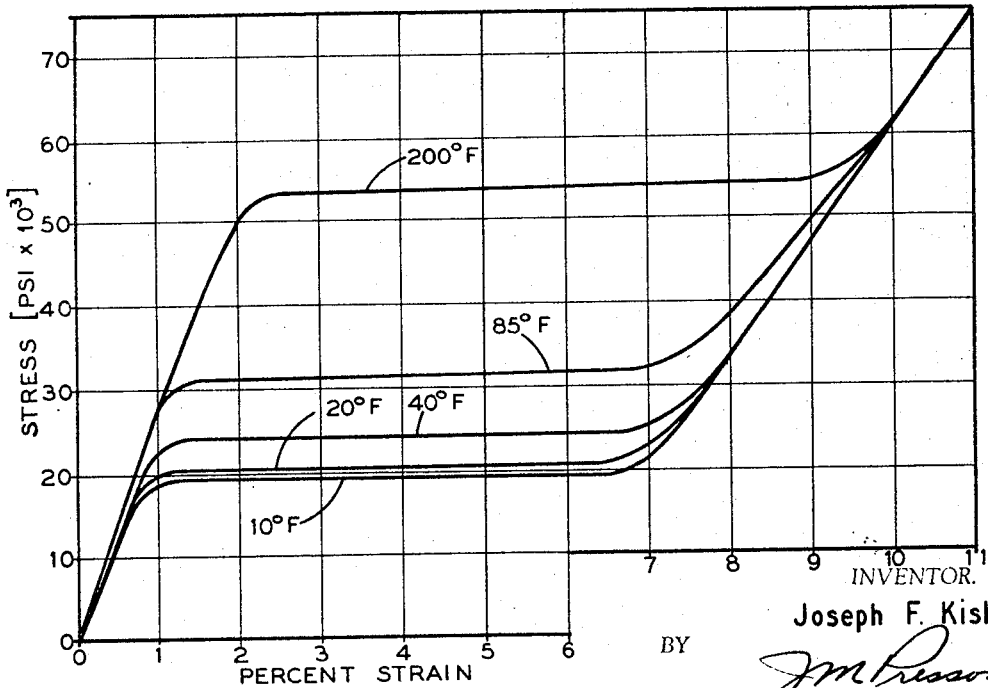
FIGURE 2 illustrates graphically typical inter-relationships between stress, strain and ambient temperature for a single super-elastic crystal alloyed with copper aluminum and nickel.

FIGURE 2 illustrates the stress versus strain characteristic curves of a single super-elastic crystal alloyed with copper, aluminum and nickel for various magnitudes of temperature greater than 0° F. It may be seen from this figures that the height of the stress plateau region increases with increasing temperature.

Figure 3:
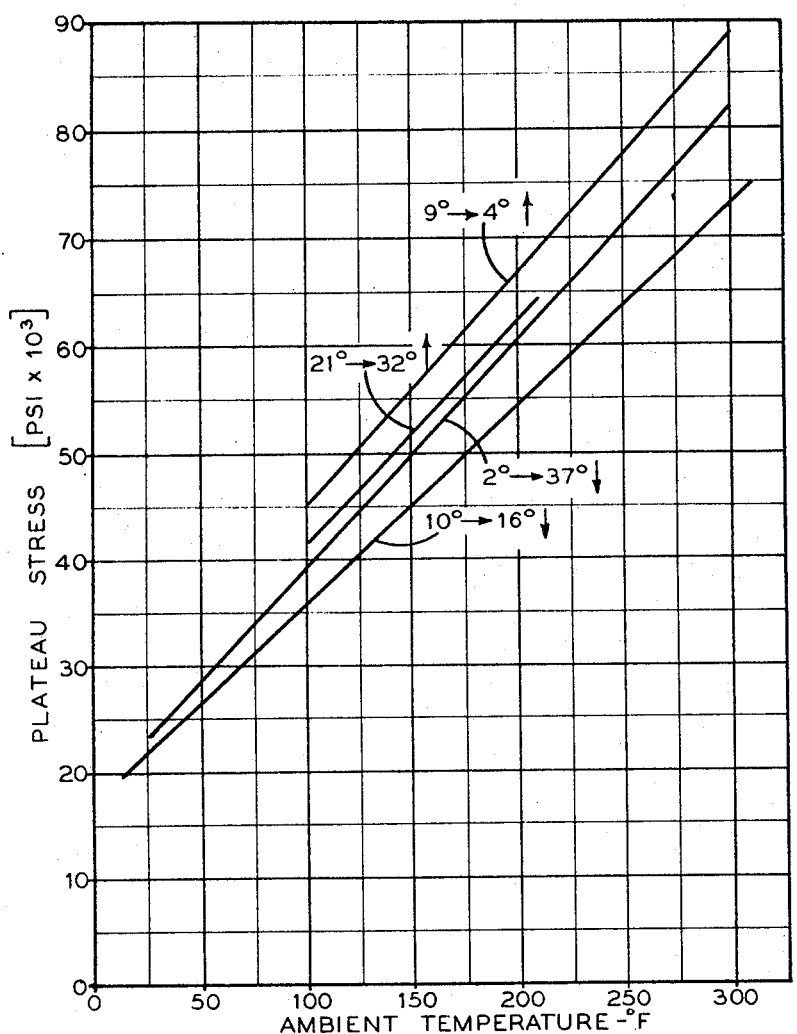
FIGURE 3 illustrates graphically the linear relationship between plateau tensile stress and ambient temperature for single super-elastic crystals alloyed with copper, aluminum and nickel and having various crystallographic orientations with respect to the axes of applied tensile force.

FIGURE 3 is a plot of plateau stress versus percent total strain for four single crystals composed of the same super-elastic alloy of 82.5% copper, 14.5% aluminum and 3% nickel. As an examination of FIGURE 3 will bear out, the relationship between plateau stress and temperature from 10° F. to more than 300° F. is linear, positive and independent of the orientation of the crystal axes relative to the axes of applied tensile force. The degree to which the crystallographic axes of each crystal are offset from the horizontal and vertical tensile axes are indicated by numerals in FIGURE 3 and the directions of crystallographic axis offset from the horizontal or vertical tensile axes is indicated by associated horizontal and vertical arrows, respectively. Depending upon the properties of a particular crystal, the linear relationship between plateau stress and temperature may extend through a range from 0° F. to more than 350° F.

It was also observed that a discontinuity occurs in the plateau stress versus temperature curve of the single super-elastic copper-aluminum-nickel crystal when the ambient temperature falls below 0° F. This discontinuity establishes a lower limit of about 0° F. to the temperature range of the device of the present invention which utilizes super-elastic structures having tensile stress versus temperature characteristics similar to those characteristics depicted by FIGURE 3. The discontinuity is attributed to a thermally-induced beta to martensitic phase transformation which is similar in nature to the previously described mechanically-induced beta to martensitic phase transformation which occurs when the crystal is stressed to its plateau region.

Reversible phase transformations have also been reported in the other three alloy systems mentioned briefly hereinabove. For example, M. J. Duggin and W. A. Rachinger in a paper entitled "A Martensitic Transformation in Gold-Copper-Zinc Alloy" published in Acta Metallurgica, vol. 12, September 1964, pages 1015–1024 discloses that a similar transformation below room temperature occurred in a single crystal alloy comprising by weight 48.4% gold, 20.7% copper and 30.9% zinc. In the gold-cadmium alloy system referred to hereinabove, a reversible martensitic transformation is disclosed by L. C. Chang and T. A. Read in a paper entitled "Plastic Deformation and Diffusionless Phase Changes in Metals— The Gold-Cadmium Beta Phase," Transactions of the AIME, vol. 191, January 1951. The indium-thallium alloy system was also observed to have a reversible transformation from 18 atomic percent thallium at 105° C. to 23 atomic percent thallium at 25° C. and is reported by M. W. Burkart and T. A. Read in a paper entitled "Diffusionless Phase Change in the Indium-Thallium System," Journal of Metals, November 1953, pages 1516–1524. Manifestly, any of these alloy systems or any other alloy system having the characteristics of parallel stress plateau regions, negligible hysteresis in the plateau regions and a linear relationship between plateau stress and temperature might be used as a thermal-to-mechanical energy transducer in the device of the present invention.

Referring now to FIGURE 4, numeral 20 refers to a device which is constructed in accordance with this invention to function as a thermometer. The thermometer 20 comprises a cylindrical casing 21 which may be formed with a plurality of apertures 22 in the cylindrical casing wall adjacent the lower end of the casing 21 to permit ingress and egress of a gas or liquid, the temperature of which is to be measured by the thermometer 20. The bottom wall of the casing 21 is provided with a circular recess 23 into which the lower end of an elongated, crystalline structure 24 composed of a super-elastic metal alloy is seated, the recess 23 limiting radial displacement of the lower end of the crystal 24 in the casing 21. Although the crystalline structure 24 is shown as being of I-cross sectional shape the structure may be in the form of a single, drawn crystal of generally circular cross-sectional shape or of practically any desired cross-sectional shape and outer configuration. The crystal 24 responds to changes in ambient temperature and, for reasons discussed hereinabove, is selected or formed so as to have stress-strain-temperature characteristics which are similar to the curves illustrated in FIGURES 2 and 3. A pair of plates 25 fixed by, for example, screws 26, to the bottom of the casing 21 hold the lower end of the crystal 24 in firm contact with the bottom of the recess 23, so as to preclude longitudinal movement of the crystal 24 in the casing 21.

A thin, flexible wire having a high modulus of elasticity has one end wrapped around and anchored by welding, clamping or other means to the upper end of crystal 24. The upper end of the crystal 24 may be slotted as at 24A, FIGURE 4A, so that the longitudinal axis of the portion of the wire 26 that extends from the upper end of the crystal is substantially coaligned with the longitudinal crystal axis, FIGURE 4. The wire 26 transmits, by its linear displacement, tensile forces which are developed in the crystal 24 to the lower end of a cylindrical, helical spring 28. In order to readout the linear displacement of the wire 26 as a function of temperature, the wire 26, FIGURES 4 and 4A, passes one or more times around an idlear pulley 29 which converts a linear displacement of the wire 26 to a corresponding angular displacement. A shaft 30, mounting a bushing 31 which provides a bearing surface for the inner flange or rim of the pulley 29, is fixed to, and cantilevered transversely from an arm 32 which extends inwardly of the interior wall of the casing 21. The shaft 30 mounts the pulley 29 for free rotation about an axis which is perpendicular to the longitudinal axis of the crystal 24.

The hub of the idler pulley 29 which contacts the wire 26 may be abraded to increase the coefficient of friction between the pulley 29 and the wire 26. Alternatively, the wire 26 may be attached at one point to the pulley 29 to obviate the possibility of slippage therebetween. With the wire 26 wrapped one or more times around the pulley 29 linear displacements of the wire 26 will cause corresponding angular displacements of the pulley 29.

Since there is a linear relationship between plateau stress and temperature, at least for temperatures above 0° F., the angular displacement of the pulley 29 may be readily converted to an indication of temperature. To this end, the pulley 29 is provided with a pointer 35 which is affixed at one end to rotate with the pulley 29 and has its opposite end referenced to a scale 36 that is calibrated in degrees of temperature, $T_0$, $T_1$, $T_2$ ... $T_N$. The position of the pointer 35 relative to the scale 36 may be viewed through a transparent window, not shown, which may be detachably mounted on the front of the casing 21. With the window removed from the casing 21 access may be had to the coil spring 28, the pointer 35 and the scale 36.

The spring 28 is designed to provide a tensile force which increases and deceases linearly with respective longitudinal extensions and contractions of the spring.

To ensure that the spring 28 itself does not elongate or contract to any significant extent with changes in temperature and introduce an error in the temperature reading of the thermometer 20, the spring may be composed of an isothermal material, such as Invar. Several coils at the upper end of the spring 28 are wound into the continuous groove of V or U-cross section formed by the threads of a helical screw 40 having a pitch and pitch diameter substantially equal to that of the spring 28. The screw 40 mates with an internally-threaded section of an externally-threaded hexagonal nut 41.

To ensure that the spring 28 does not snap out of the grooves of the screw 40 when placed under tension, and additional clamping device may be employed to clamp the threaded ends of the spring 28 against slippage. Such a device preferably should have the facility of being removable or loosened when its is desired to turn the screw 40 in the spring 28 so as to increase or decrease the number of coils threaded by the screw 40. As will be apparent to those working in the art, various types of devices are suitable for this purpose. One such device comprises a sleeve having a threaded section for engaging the threads of the screw 40 and a contiguous section which may or may not be threaded but which may be moved axially down and up the screw by turning the sleeve to selectively clamp the threaded coils of the spring 28 in nonslip engagement with the threads of the screw 40. For some applications, the spring 28 may be immovably anchored to the screw 40 by welding or the like. However, with the spring 28 merely wound on the screw 40 and, if desired, clamped thereto, and with the scale-viewing window, not shown, of the thermometer 20 removed, the spring 28 may be gripped and the screw 40 turned to vary the number of spring coils which are free to elongate or contract.

As is known to those working in the spring art, the resistance to longitudinal extension which is offered by a cylindrical, helical spirng is an inverse function of the number of spring coils which are free to extend or contract. Thus, by increasing the number of free coils the resistance that the spring offers to an extending force is decreased proportionately and, conversely, decreasing the number of free coils or turns causes the resistance of the spring extension to increase proportionately. By turning the screw 40 in one direction with the nut 41 held stationary, it is possible to provide, within the elastic limit of the spring, any desired linear relationship between the resisting force which the spring 28 offers to the oppositely-directed tensile forces produced by the crystal 24. To facilitate turning of the screw 40, the end of the screw 40 which projects from the exterior of the casing 21 is slotted, as indicated by the numeral 42, to receive the blade tip of a screwdriver or similar tool.

In order to provide a predetermined, initial elongation to the crystal 24, the spring 28 is initially tensioned to a preselected threshold level of stress and, thus, requires the application of a greater-than-threshold magnitude of tensile force through contraction of the crystal 24 before any additional extension of the spring 28 occurs. To effect the initial pre-stressing of the spring 28, the nut 41 is provided with external threads that mate with an internally-threaded end of the casing 21 and may be manually turned in the casing 21 using a wrench or similar tool. If desired, the upper end of the casing 21 may be scribed and the nut 41 may be precalibrated and similarly scribed so that after the nut 41 is turned a predetermined number of times and the two scribe marks aligned, the spring 28 will be prestressed a predetermined amount. In a similar fashion, the screw 40 may be precalibrated with reference to the nut 41 so that with the spring 28 gripped against rotation after the screw is turned a predetermined number of times in the nut 41 and the scribe marks on the screw and nut aligned, the stiffness of the spring will also be preestablished. A swivel 44, FIGURE 4, of a conventional ball and sleeve type, couples the lower end of the spring 28 to the wire 26 in tension but permits rotation of this of the spring about the wire 26 and thus serves to prevent the wire 26 from twisting and shortening during adjustment of the screw 40 or the nut 41.

The spring 28, the screw 40 and the nut 41, FIGURE 4, cooperate to provide a tensile load to the crystal 24 which is representable by a load line on the stress versus strain curves of the super-elastic crystal 24. In order to facilitate an understanding of this aspect of the invention, reference is directed to FIGURE 5 which shows characteristic stress versus strain curves of a super-elastic crystal 24 for increasing values of temperature $T_0, T_1 \ldots T_N$. A linear load line 43 is shown intersecting the plateau regions of these curves and has a negative slope by reason of the spring 28 opposing the tensile force produced by the crystal 24. As mentioned hereinabove, the screw 40 established the degree of slope of the load line 43 whereas the nut 41 establishes the initial elongation of the spring 28 and, thus, establishes the initial, maximum elongation of the crystal 24. In other words, the nut 41 sets the point, designated $E_x$ in FIGURE 5, where the load line 43 intersects the strain coordinate axis.

Assuming that the initial tensile force applied to the crystal 24 produces an initial stress $S_0$, in pounds per square inch which corresponds to an initial percent strain $E_0$ at the lowest temperature $T_0$ in degrees Fahrenheit of the temperature range to be measured by the thermometer 20, the intersection of the coordinates $S_0$ and $E_0$ on the $T_0$ plateau will be stable with the crystal 24 appearing to the spring 28 as a constant opposing tensile force at the temperature $T_0$. If necessary, the ratio of tensile force to spring displacement and, hence, the slope of the load line 43 may be increased or decreased by turning the screw 40. The load line 43 is shown as intersecting the plateau region representing the highest temperature $T_N$ of the temperature measuring range at a point having a stress coordinate $S_N$ and a strain coordinate $E_N$; the slope of the load line being equal to the ratio of $$\frac{S_N - S_0}{E_N - E_0}$$

Assuming that the load line 43 intersects the plateau region $T_4$ and that the temperature of the medium in which the thermometer 20 is placed and the ambient temperature of the crystal 24 increases from temperature $T_0$ to temperature $T_3$, the operating point on the characteristic stress versus strain curves of the super-elastic crystal 24 will follow up along the load line 43 to intersect the plateau region corresponding to the temperature $T_3$.

This intersection has a stress coordinate $S_3$ and a strain coordinate $E_3$. Since the magnitude of the stress $S_3$ is considerably greater than the magnitude of the initial stress $S_0$, a downwardly directed tensile force will be applied to the wire 26, FIGURE 4, and cause clockwise rotation of the pulley 29 and corresponding extension of the coil spring 28. The angular displacement of the pulley 29 produces a corresponding angular displacement of the pointer 35 to the temperature designated $T_3$ on the scale 36, thereby providing a visual indication of the ambient temperature of the crystal 24. If the ambient temperature thereafter decreases, the operating point of the thermometer 20 will then, in effect backtrack, moving downward and to the right as viewed in FIGURE 5, following the negatively sloped load line 43 until the operating point intersects the plateau region that corresponds to the new, lower temperature.

The scale factor of the thermometer 20 is definable as the degree of angular displacement of the pointer 35 per degree temperature change in the crystal 24. By increasing the negative slope of the load line 43, the scale factor is increased since it now requires a greater change in temperature to effect an equal degree of rotation of the pulley 29 and the pointer 35. Conversely, the scale factor of the thermometer 20 is decreased by decreasing the negative slope of the load line 43. Since the screw 40 governs the stiffness of the spring 28 (and hence the slope of the load line 43) the scale factor of the thermometer 20 may be established by an operative turning the screw 40 to increase or decrease the number of spring coils which are free to elongate and retract. Thus, by turning the screw 40 so as to increase the number of free coils of the spring 28 the slope of the load line 43 is decreased along with a corresponding decrease in the scale factor of the instrument. Conversely, by turning the screw 40 so as to decrease the number of free spring coils, the slope of the load line 43 and the scale factor of the instrument are correspondingly increased. Of course, the load line intercept with the strain coordinate axis will remain unaffected by changes in slope of the load line.

The temperature range of the thermometer 20 may be increased or decreased by turning the nut 41 in a direction which would cause the nut 41 to advance outwardly or inwardly, respectively, of the casing end in which the nut 41 is mounted so as to respectively increase or decrease the tensile force which is applied to the spring 28. The spring 28 and the screw 40 will turn with the nut 41 by reason of the considerable tensile force which is applied by the wire 26 to the spring 28 and the screw 40 but the swivel 44 will prevent the transmission of axial rotation of the spring 28 to the wire 26. As the tensile force applied to the spring 28 is increased, the load line 43, FIGURE 5, will be shifted to the right, as viewed in this figure, to intersect the strain coordinate axis at a corresponding higher value of percent strain. Conversely, as the tensile force applied to the spring 28 is decreased, the load line 43 will be shifted to the left, as viewed in FIGURE 5. The slope of the load line 43 will remain unchanged during and after the shifting thereof by reason of the screw 40 turning with the spring 28 but the curves which are now intersected by the shifted load line 43 correspond to higher or lower ranges of measurable values of temperature.

As will be apparent, the stiffness of the spring 28 may have to be initially adjusted by rotating the screw 40 to provide an initial slope to the load line 43 such that the subsequent shifting of the load line, by the outward axial movement of the nut 41, does not cause the load line to intersect the characteristic curves, FIGURE 5, above the plateau temperature regions. As related hereinabove, mechanical hysteresis may be introduced into the system if the super-elastic crystal under ambient temperature conditions is stressed to a point on its characteristic curve which is above its plateau region.

If a full scale deflection of the pointer 35 is desired for a specified temperature range, within the plateau temperature range, of the thermometer, appropriate adjustment of the load line slope and its point of intersection with the strain coordinate axis may be made. To illustrate, if the graduation designated $T_0$ on the scale 36, FIGURE 4, is to correspond to ambient temperature $T_1$, FIGURE 5, and the graduation $T_N$ on the scale 36 is to correspond to ambient temperature $T_5$, FIGURE 5, the nut 41 may be turned to increase the initial elongation of the crystal 24 to a value $E_x'$. The screw 40 may then be turned to increase the number of the free coils of the spring 28 until the slope of the new load line 43' decreases to a point where the new load line intersects the temperature plateau regions between and including temperatures $T_1$ and $T_5$.

In view of the foregoing, it will be evident that the thermometer 20 provides many stable operating points within the plateau temperature range $T_0$—$T_N$ of the crystal 24 and presents a visual indication of the ambient crystal temperature of any one of such operating points. The thermometer 20 may be simply and ruggedly constructed and provides a substantial driving force to the pointer or other suitable readout mechanism. In addition, the scale factor and the range of the thermometer may be readily and easily varied.

While there has been described what is at present considered to be a preferred embodiment of this invention, it will be obvious to those skilled in the art that various changes and modifications may be made without departing from the invention, and it is, therefore, intended to cover all such changes and modifications as fall within the true spirit and scope of the invention.

What is claimed is:

1. A device for detecting a change in temperature which comprises means for providing an indication of a change in temperature in response to a mechanical force applied thereto, and an element coupled to said means so as to apply a mechanical force thereto and composed at least partially of a metal having super-elastic tensile stress-strain characteristics throughout a temperature range which includes the temperature to be detected, said element converting ambient thermal energy into a corresponding mechanical force.

2. The device as claimed in claim 1, which further comprises: means mounted for displacement in said device for applying a tensile force to said element which varies a direct function of the force produced by said element.

3. The device as claimed in claim 1, wherein said element comprises a crystalline structure composed of a metallic alloy.

4. The device as claimed in claim 3, wherein the alloy comprises substantially 82.5% copper, 14.5% aluminum, and remainder nickel.

5. A device for detecting changes in temperature comprising: a metallic super-elastic element characterized by a family of stress-strain curves having plateau regions where the stress has substantially constant values independent of a range of values of strain and varies in magnitude substantially as a direct function of temperature, means for applying a tensile force to said element that is representable by a load line on said family of curves which intersects plateau regions in the desired temperature range, and means for detecting a temperature-caused change in stress of said element.

6. A device for detecting changes in temperature comprising: a metallic super-elastic element characterized by a family of tensile stress-strain curves having plateau regions where the stress has substantially constant values independent of a range of values of strain and varies in magnitude substantially as a direct function of temperature, means for applying a tensile force to said element that is representable by a load line on said family of curves, means for providing an initial load to the tensile force applying means of magnitude such that the load line intercepts a predetermined point on a stress-strain curve of said family of curves, and means for detecting temperature-induced changes in the tensile stress of said element.

7. The device as claimed in claim 6, wherein means are additionally provided for varying the magnitude of the tensile force applied by said tensile force applying means to said element so as to vary the slope of the load line relative to the plateau regions.

8. The device as claimed in claim 7, wherein said means for applying a tensile force to said element comprises a helical spring.

9. The device as claimed in claim 8, wherein said means for varying the magnitude of the tensile force comprises a threaded screw having two ends, one end of said screw being threaded into one end of said spring and the opposite end being threadedly connected to the device.

10. In a device for detecting a change in temperature which includes the combination of means responsive to a mechanical stress applied thereto and transducing means for converting ambient thermal energy to a mechanical stress, wherein the improvement at least is included in the transducing means and comprises, at least one element formed of a super-elastic metal characterized as having a substantially linear relationship between ambient temperature and the mechanical stress produced in said element.

11. The device as claimed in claim 5 wherein the said element comprises a single crystal formed of a superelastic metal alloy.

References Cited

UNITED STATES PATENTS 2,918,820  12/1959  Barton _____ 73—363.9

LOUIS R. PRINCE, *Primary Examiner.*

WILLIAM A. HENRY II, *Assistant Examiner.*